United States Patent
Swaine et al.

(10) Patent No.: US 9,223,677 B2
(45) Date of Patent: Dec. 29, 2015

(54) GENERATION OF TRACE DATA IN A MULTI-PROCESSOR SYSTEM

(75) Inventors: Andrew Brookfield Swaine, Cambridge (GB); Michael John Williams, Cambridgeshire (GB); David Kevin Hart, Cambridge (GB); Andrew Christopher Rose, Cambridge (GB)

(73) Assignee: ARM Limited, Cambridge (GB)

( * ) Notice: Subject to any disclaimer, the term of this patent is extended or adjusted under 35 U.S.C. 154(b) by 1378 days.

(21) Appl. No.: 12/155,926

(22) Filed: Jun. 11, 2008

(65) Prior Publication Data
US 2009/0313507 A1    Dec. 17, 2009

(51) Int. Cl.
*G06F 11/34*    (2006.01)
*G06F 11/36*    (2006.01)

(52) U.S. Cl.
CPC .......... *G06F 11/348* (2013.01); *G06F 11/3636* (2013.01)

(58) Field of Classification Search
CPC   G06F 11/3636; G06F 11/348; G06F 11/3476
USPC .......................................................... 714/45
See application file for complete search history.

(56) References Cited

U.S. PATENT DOCUMENTS

| 7,007,201 | B1 * | 2/2006 | Byrne et al. | 714/27 |
| 2003/0229823 | A1 * | 12/2003 | Swaine et al. | 714/25 |
| 2005/0149603 | A1 * | 7/2005 | DeSota et al. | 709/200 |
| 2005/0268177 | A1 * | 12/2005 | John | 714/47 |
| 2006/0117229 | A1 * | 6/2006 | Swaine et al. | 714/45 |
| 2006/0242627 | A1 * | 10/2006 | Wygodny et al. | 717/128 |
| 2007/0255933 | A1 * | 11/2007 | Moyer | 712/234 |
| 2009/0006934 | A1 * | 1/2009 | Horley et al. | 714/819 |

FOREIGN PATENT DOCUMENTS

GB    2 443 277    4/2008

* cited by examiner

*Primary Examiner* — Jigar Patel
(74) *Attorney, Agent, or Firm* — Nixon & Vanderhye P.C.

(57) ABSTRACT

A data processing apparatus is provided having a plurality of processing circuits each having access to a memory. Tracing circuitry is provided for generating a stream of trace data for generating a stream of trace data corresponding to at least one of the plurality of processing circuits. Selection circuitry is provided to enable selective switching of the tracing circuitry from generating a first trace data stream corresponding to a first one of the plurality of processing circuits generating a second different trace data stream corresponding to a different one of the plurality of processing circuits. The selective switching is performed in dependence upon processing state information associating with one or more of the plurality of processing circuits. A corresponding method and computer program product are also provided.

28 Claims, 8 Drawing Sheets

GENERATION OF TRACE DATA IN A MULTI-PROCESSOR SYSTEM

BACKGROUND OF THE INVENTION

1. Field of the Invention

The present invention relates to the generation of trace data within a data processing apparatus.

2. Description of the Prior Art

There is a requirement for data processing systems having improved performance and functionality, which typically means an increase in the complexity of the systems. Furthermore, there is a requirement to reduce the development and testing time for these more complex data processing systems, which means that there is an increasing need for powerful yet easy-to-use diagnostic mechanisms for identifying problems associated with data processing systems and to improve the performance of those data processing systems by adjusting their design and configuration.

There is a general move towards more deeply-embedded processor cores, which makes it more difficult to track the architectural state of the processor (such as the contents of registers, values stored at particular memory locations or status of the buses, paths, lines, flags or modules within the processing system) via externally accessible pins. Accordingly, as well as off-chip tracing mechanisms for capturing and analysing trace data, increased amounts of tracing functionality are being placed on-chip. Examples of such on-chip tracing mechanisms are the Embedded Trace-Macrocell (ETM) provided by ARM Limited, Cambridge, England in association with their various ARM processors.

Such tracing mechanisms could use a real-time stream of trace data representing the activities of the data processing system that are desired to be traced. This stream of trace data can subsequently be used to facilitate debugging of sequences of processing instructions included in software code being executed by the data processing apparatus.

Another trend within data processing systems is the increasing use of multi-processor systems. These are used to deliver higher performance by permitting and processing to be performed in parallel by the plurality of processors. However, tracing circuitry such as ETMs are expensive in terms of silicone area so that it becomes inefficient to supply such multi processor systems with separate sets of tracing circuitry corresponding to each of the plurality of processors of the system.

It is known to share one ETM between a plurality of processing cores using static switching whereby, in advance of the diagnostic processing being performed, a debug tool selects which of the plurality of processors is to be traced and configures the trace subsystem to trace a particular one of the plurality of processors. For example, the processor to be traced by the single ETM may be set via a register entry during a programming phase (rather than an operational phase) of the data processing system. However, such static switching is inflexible since it does not allow a given processing task to be fully traced if the task under observation moves from processor to processor. Thus, in known systems, the only way of reliably fully tracing a process that switches from processor to processor is to trace all of the processors substantially simultaneously. This requires a set of tracing circuitry for each of the plurality of processors. However, even in multi-processor systems having multiple ETMs, trace bandwidth constraints are likely to mean that it is still not possible to enable tracing on a plurality of ETMs substantially simultaneously.

Accordingly there is a need for a more flexible and more efficient tracing mechanism for performing trace in a multiple processor system.

SUMMARY OF THE INVENTION

According to one aspect the present invention provides apparatus for processing data for performing one or more processing tasks by executing sequences of program instructions, said apparatus comprising:

a plurality of processing circuits each having access to a memory;

tracing circuitry for generating a stream of trace data indicative of processing operations being performed by at least one of said plurality of processing circuits;

selection circuitry configurable to selectively switch, during execution of said program instructions, said tracing circuitry from generating a first stream of trace data corresponding to one of said plurality of processing circuits to generating a second different stream of trace data corresponding to a different one of said plurality of processing circuits in dependence upon processing state information associated with at least one of said plurality of processing circuits.

The present invention recognises that a more flexible tracing system can be provided for a data processing system comprising a plurality of processing circuits, in which the tracing circuitry is configurable by selection circuitry to be selectively switched during execution of program instructions, from tracing one of the plurality of processing circuits to tracing a different one of the plurality of processing circuits. Switching from tracing one to another of the processing circuits during an operational phase of the data processing apparatus (rather than during a programming phase) provides the additional flexibility of being able to trace a process under observation even if the process switches from processor to processor. This provides for more efficient use of the tracing circuitry since the tracing circuitry is not dedicated during program execution to tracing a specific processor but can be re-deployed as required to generate trace streams corresponding to different ones of the plurality of processing circuits. This reduces the silicon area required for tracing a multi-processor system and thus reduces the cost of the tracing circuitry yet provides more functionality and flexibility than known systems having shared tracing circuitry that is statically switched between processors. The present invention recognises that the selective switching of the tracing circuitry during execution of the program instructions can be performed in dependence upon processing state information associated with at least one of the plurality of processing circuits. This provides an efficient way of controlling which processing circuit is traced.

It will be appreciated that the data processing apparatus having a plurality of processing circuits could be an asymmetric multi-processor system in which the tracing circuitry is selectively switched during program instruction execution to trace different processors executing on different processors. However, in one embodiment the plurality of processors of the data processing system comprises a symmetric multi-processor system in which execution of a given one of the one or more processing tasks may switch from one of the plurality of processing circuits to another different one of the plurality of processing circuits during execution of the sequence of program instructions. In such embodiments, provision of the selection circuitry to enable the tracing circuitry to be selectively switched from tracing one of the plurality of processing circuits to a different one of the plurality of processing circuits enables the tracing circuitry to trace a given process as it switches between multiple processors, switching from one processor to another as required. This provides the ability to trace the processes migrating between different processors in symmetric multi-processor systems without the cost of providing a set of tracing circuitry for each individual processor.

It will be appreciated that the processing state information in dependence upon which the switching between tracing of one processor to tracing a different one of the plurality of processing circuits could be any one of a number of different types of processing state information. Examples of the processing state information are the contents of registers of one of the processing circuits, values stored at particular memory locations or status of buses, paths, lines or condition flags. However, in one embodiment, the processing state information comprises an indication of whether a configurable condition within a corresponding one of the plurality of processing circuits has been satisfied. This provides a convenient way of determining when to selectively switch tracing from one processing circuit to a different processing circuit yet is straight-forward to implement.

It will be appreciated that the processing state information could be output by a component of the data processing apparatus other than one of the plurality of processing circuits, for example processing state information could be output from part of the memory system or from a separate processing module associated with one of the processing circuits. However, in one embodiment the processing state information is output by at least one of the plurality of processing circuits. Provision of the processing state information directly from at least one of the plurality of processing circuits provides a reliable and direct means of communicating to the selection circuitry information how the tracing circuitry should be selectively switched.

It will be appreciated that the processing state information output by at least one of the plurality of processing circuits could comprise a variety of different types of state information that could be used to determine whether or not to switch between tracing one processing circuit to tracing a different processing circuit. However in one embodiment the processing state information comprises information identifying which of the plurality of processing circuits of the data processing apparatus is currently executing a given processing task. This facilitates reliable tracing of a given processing task even if that processing task switches between different ones of the plurality of processing circuits during execution of the processing task.

It will be appreciated that the state information that identifies which of the plurality of processing circuits currently executing a given processing task could identify the processing task at the level of the task only, but in one embodiment the processing state information comprises information identifying a given thread corresponding to the given processing task. This provides a finer level of control via the selection circuitry to selectively switch the tracing circuitry to performing tracing of a given processor on a thread by thread basis rather than on a task by task basis.

In one embodiment the processing state information comprises information identifying a given instruction execution address. This provides a convenient trigger upon which to enable the selection circuitry to switch the tracing circuitry from switching one processing circuit to tracing a different processing circuit.

In some embodiments, the processing state information comprises information output by at least one of the plurality of processing circuits. However, in alternative embodiments, a processing state information comprises information identifying which of the plurality of processing circuits currently has write access to a given location in the memory associated with the data processing apparatus. This enables efficient tracing of step-by-step activity within the data processing apparatus and allows for monitoring of a particular memory location of interest to debug software regardless of which of the plurality of processing circuits currently has write access to that memory location. This is useful, for example, in data processing systems having a coherent memory since it enables accurate tracing of all updates to that given memory location.

It will be appreciated that the selection circuitry could selectively switch tracing activity of the tracing circuitry in dependence upon tracing state information in a number of different ways depending on the particular type of processing state information that is used. However, in one embodiment, the data processing apparatus comprises comparator circuitry configurable to perform a comparison of the processing state information from at least one of the plurality of processing circuits with a configurable condition. This is an efficient way of determining which of the plurality of processing circuits should be traced at any one time.

It would be appreciated that in embodiments having comparator circuitry, the comparison could be based on different configurable conditions for respective different ones of the plurality of processing circuits. However, in one embodiment the comparator circuitry is arranged to perform a comparison of the processing state information from each of the plurality of processing circuits using a given configurable condition. This provides a convenient means of tracking, for example, which of the plurality of processors is currently running a given processing task enabling that given processing task to be reliably traced regardless of which of the plurality of processing circuits is currently executing the task.

Although the comparison based on a given configurable condition could be based on any one of a number of types of processing state information, in one embodiment the comparison is based on context identifier information from a corresponding one of the plurality of processing circuits. The context identifier information can be readily obtained from the corresponding processing circuit yet provides a reliable means by which to identify a processing task currently being executed.

In one such embodiment in which the context identifier information is used by the comparator circuitry, the context identifier information comprises information identifying a memory map currently being used by the corresponding one of the plurality of processing circuits. This recognises that the current memory map is expected to change on a process by process basis but is not likely to change for different threads corresponding to the same process.

Although in some embodiments comparator circuitry is provided to compare processing state information with a given configurable condition, in alternative embodiments comparator circuitry is not specifically required, since at least one of the plurality of processing circuits comprises breakpoint circuitry which is to perform a comparison of the processing state information from the corresponding one of the plurality of processing circuits with a configurable condition and configured to supply a result of the comparison to the selection circuitry. This is convenient and cost-effective, since breakpoint circuitry is likely to be provided in at least one of the plurality of processing circuits anyway and re-deployment of the breakpoint circuitry to enable selective switching of the tracing circuitry from tracing one processing circuit to tracing the different processing circuit enables a reduction in the silicon area required for the tracing circuitry of the multi-processor system.

It will be appreciated that, in embodiments in which comparator circuitry is provided, a single module of comparator circuitry could be provided for performing the comparisons of two or more of the plurality of processing circuits of the multi-processor device. However, in one embodiment, at least two of the plurality of processing circuits have respective comparator circuits performing the comparison based on the configurable condition. This simplifies the implementation of the individual comparator circuits.

In one such embodiment comprising at least two comparator circuits corresponding to respective ones of the plurality of processing circuits, the apparatus comprises arbitration circuitry responsive to comparison results from the respective comparator circuits to determine whether any of the at least two processing circuits has in fact satisfied the configurable condition. Provision of the arbitration circuitry provides a convenient way of correlating information with regard to the state of different ones of the plurality of processing circuits and facilitates selection of an appropriate one of the processing circuits for which the tracing circuitry should generate a stream of trace data.

It will be appreciated that a single module of tracing circuitry could be provided for tracing all of the plurality of processing circuits of the multi-processor device. However, in one embodiment a plurality N of processing circuits and a plurality M of modules of tracing circuitry are provided, where M and N are non-zero integers and wherein M is less than N. Thus the number of modules of tracing circuitry is less than the number of processing circuits. This reduces the silicon area relative to providing a one-to-one correspondence between processing circuits and tracing modules. Furthermore, in embodiments of this kind, where the number of modules of tracing circuitry is two or more, this enables tracing of communication between different ones of the plurality of processing circuits in a more efficient way. Tracing of communication between processors requires tracing two or more processing circuits substantially simultaneously.

In one embodiment, the tracing circuitry is configured to generate both data trace and instruction trace. This enables resources for tracing both instructions and data to be shared between a plurality of processors.

In an alternative embodiment, the tracing circuitry is configured to generate data trace but not instruction trace. This enables selective switching of data trace circuitry between different ones of the plurality of processors plus saves silicon area for the purposes of generating data trace. Generation of trace data is likely to be more expensive in terms of silicon area than generating instruction trace due to the more predictable nature of instruction execution ordering, so avoiding hardware duplication in performing data trace is desirable In some such embodiments in which the selectively switchable tracing circuitry generates only trace data but not instruction trace, each of the plurality of processing circuits has a respective module of instruction tracing circuitry. Since the instruction tracing circuitry is typically less complex than data trace circuitry, replication of the instruction tracing circuitry for each of the plurality of processing circuits presents only a small overhead, yet the more complex data trace circuitry is effectively shared between a plurality of processing circuits via the ability to selectively switch the data trace circuitry using the configurable selection circuitry.

It will be appreciated that the configurable condition in dependence upon which the selection circuitry selects which of the plurality of processing circuits to trace could be configured in any one of a number of different ways, for example, by a test engineer. However, in one embodiment, the apparatus comprises a programming interface and the configurable condition is configurable by debugging software via the programming interface. This provides a convenient means by which control of the selective switching of the tracing circuitry, can be performed.

In one embodiment, the memory to which the plurality of processing circuits of the data processing apparatus have access comprises a coherency controller and the processing state information (in dependence upon which the selective switching is performed) is output by the coherency controller. This enables efficient tracing of activity corresponding to a given storage location in the memory system associated with the data processing apparatus. In one such embodiment the processing state information comprises an indication of which of the plurality of processors currently has write access to a given location in the memory.

It will be appreciated that the selection circuitry could be configured such that changes to the processing state information would always be likely to give rise to a switch between tracing of one of the plurality of processing circuits to another different one of the plurality of processing circuits. However, in one embodiment, the selection circuitry is configurable to suppress the selective switching of the tracing activity such that whilst the suppression is performed, the tracing activity generates a trace data stream corresponding to a given one of the plurality of processing circuits regardless of the processing state information. This provides the additional flexibility to focus tracing activity on a given one of the processing circuits of the multi-processor device rather than tracing based upon, for example, which processor is currently executing a given processing task.

According to a second aspect the present invention provides a method of generating trace information in a data processing apparatus having a plurality of processing circuits each having access to a memory and capable of performing one or more processing tasks by executing sequences of program instructions, said method comprising:

generating using tracing circuitry a stream of trace data indicative of processing operations being performed by at least one of said plurality of processing circuits;

selectively switching, during execution of said program instructions, said tracing circuitry from generating a first stream of trace data corresponding to one of said plurality of processing circuits to generating a second different stream of trace data corresponding to a different one of said plurality of processing circuits in dependence upon processing state information associated with at least one of said plurality of processing circuits.

According to a third aspect the present invention provides apparatus for processing data for performing one or more processing tasks by executing sequences of program instructions, said apparatus comprising:

a plurality of modules of tracing circuitry for generating a stream of trace data indicative of processing operations being performed by a respective one of a plurality of processing circuits of a multi-processor device, each of said plurality of modules of tracing circuitry comprising a respective comparison circuit for controlling the activities of the corresponding module of tracing circuitry dependent upon processing operations performed by the corresponding processing circuit; and at least one common configuration register configurable to store configuration data for commonly controlling a plurality of said comparison circuits.

According to this aspect, the present invention recognises that a plurality of modules of tracing circuitry corresponding to respective different processing circuits of a multi-processor device could share at least one common configurable register configurable to store configuration data for controlling a plurality of the comparison circuits. This provides a more efficient implementation of tracing circuitry by reducing the total number of configuration registers reducing the total number of configuration registers required to control the plurality of modules of tracing circuitry and means that only the common configuration register need be configured to effect the tracing activity rather than competitively configuring more than one configuration register to perform the required comparisons.

According to a fourth aspect, the present invention provides a method of generating trace information in a data processing apparatus having a plurality of modules of tracing circuitry corresponding to a respective plurality of processing circuits of a multi-processor device each of said plurality of modules of tracing circuitry comprising a respective comparison circuit for controlling the activities of the corresponding module of tracing circuitry dependent upon processing operations performed by the corresponding processing circuit, said method comprising the steps of:

storing in at least one common configuration-register configuration data for commonly controlling a plurality of said comparison circuits;

generating in dependence upon said configuration data stored in said common configuration register and using one of said plurality of modules of tracing circuitry, a stream of trace data indicative of processing operations being performed by a respective one of a plurality of processing circuits of a multi-processor device.

The above, and other objects, features and advantages of this invention will be apparent from the following detailed description of illustrative embodiments which is to be read in connection with the accompanying drawings.

DESCRIPTION OF THE PREFERRED EMBODIMENTS

Figure 1:
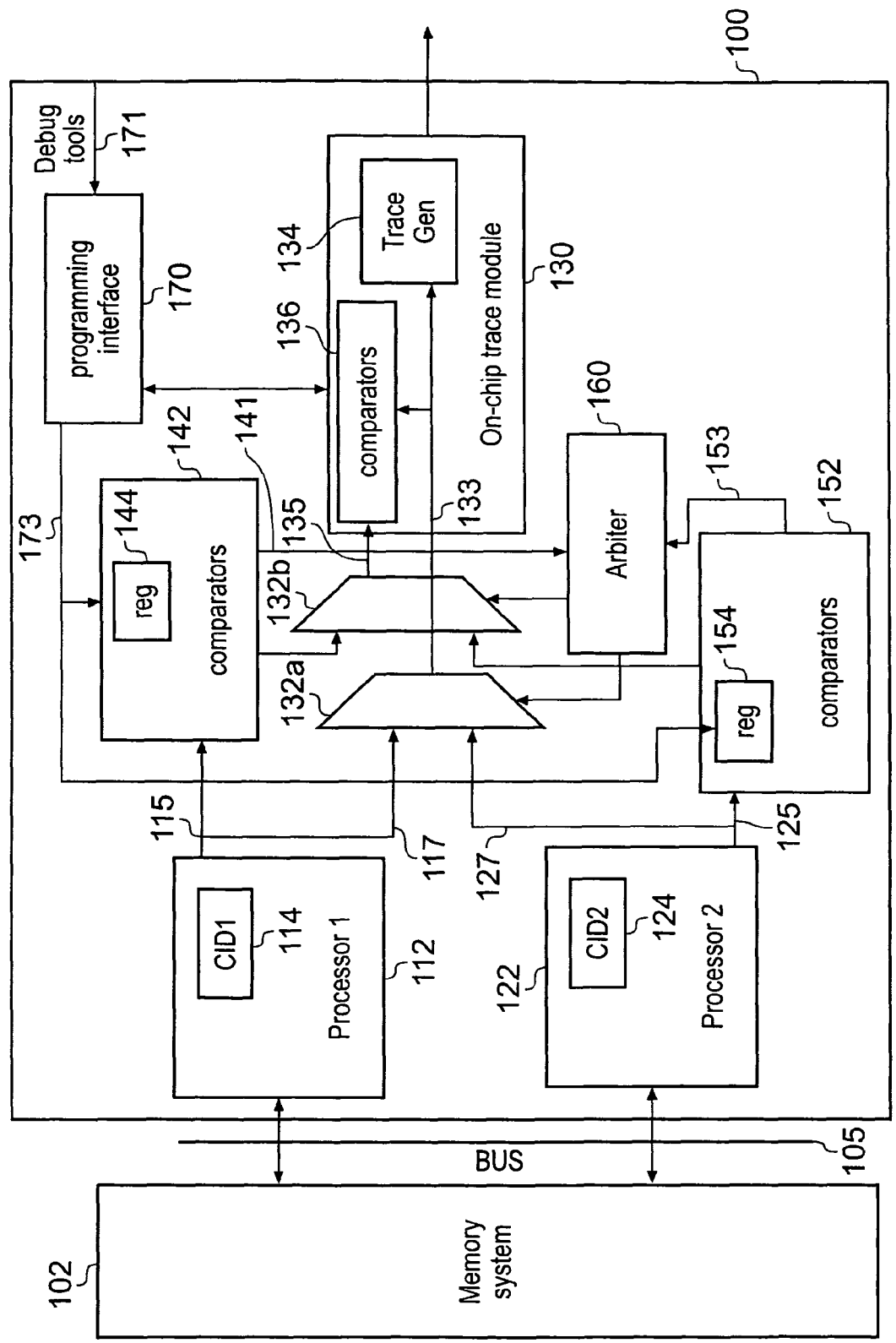
FIG. 1 schematically illustrates a symmetric multi-processor system having trace circuitry.

FIG. 1 schematically illustrates a symmetric multi-processor system having trace circuitry. The arrangement comprises an integrated circuitry 100 comprising a memory system; a first processor 112, a second processor 122; a first comparator module 142 and a second comparator module 152; an on-chip trace module 130; a first multiplexer 132a; a second multiplexer 132b; arbitration circuitry 160 and a programming interface 170. The system of FIG. 1 is known as a symmetric multi-processor system. Accordingly, the first and second processors 112, 122 are identical processors which are connected to a single shared main memory of the memory system 102. Either of the two processors 112, 122 can perform work on any processing task regardless of where any data corresponding to that processing task are located in memory. Thus the data processing system incorporating the integrated circuit 100 can easily move processing tasks between the two processors 112, 122 to efficiently balance the processing workload. The two processors 112, 122 are connected to the memory system 102 via a common bus 105. The symmetric multi-processor system of FIG. 1 can be contrasted with asymmetric multi-processor systems in which separate specialised processors are used to perform specific tasks.

Thee two identical processors 112, 122 each have an identical coherent view of program and data memory. Operating system software is responsible for allocating the tasks/threads to be performed to the individual processors and for migrating a task/thread between processors. That is, a single thread of program instruction execution is time-multiplexed between the two processors 112, 122 under operating system control. Within symmetric multi-processor systems such as that of FIG. 1, the operating system can be used to determine where individual tasks/threads are being executed and provide a programmer with the appearance of a single thread executing on a single processor even when the operating system scheduling migrates execution of a given task from one processor to another processor. Such an approach is limited to processors which are identical and where migration is performed by the operating system, i.e. without being triggered by the program itself.

The integrated circuit 100 comprises the single on-chip trace module 130 to generate trace data for both of the processors 112, 122. The on-chip trace module 130 is arranged to receive over a signal path 133 diagnostic data indicative of the processing being performed by one or other of the two processors 112, 122 at any one time. The multiplexer 132a selectively outputs diagnostic data either from the first processor 112 or the second processor 122 whilst the second multiplexer 132b selectively outputs data from either the first comparator module 142 or the second comparator module 152. The select inputs controlling both the first multiplexer 132a and the second multiplexer 132b correspond to an output of the arbiter 160. In this particular embodiment the diagnostic data passed to the on-chip trace module via the path 133 comprises both data trace and instruction trace information. The diagnostic data supplied via the signal path 133 comprises data providing an indication of the architectural state of the symmetric multi-processor system, such as, for example, information with regard to instructions and/or data presented to one or the other of the two processors 112, 122 along with additional control-type data such as an indication that a given instruction address has been indexed by one of the two processors 112, 122 or that a given instruction has failed its condition codes for some reason.

The on-chip trace module comprises trace generation circuitry 134 and a set of comparators 136. The trace generation circuitry 134 receives data relating to triggerable events, for example, instruction addresses, data values, register accesses or the occurrence of some other architectural state. The on-chip trace module 130 can be programmed via the programming interface 170 to indicate to the trace generation logic 134 when to generate a trace stream. The generation of a trace stream in dependence upon certain programmable conditions is performed such that the comparators 136 of the on-chip trace module 130 check for triggerable events and the trace generation circuitry 134 outputs a trace data stream in dependence upon output of the comparators 136. Context identifiers (see description of FIG. 2 below) can also be compared by the comparators 136. Whenever the comparators 136 detect events that should give rise to generation of a trace stream they send an enable signal to the trace generation circuitry 134 to turn the trace on and off. The trace generation circuitry 134 responds to the trace enable signal by outputting the required trace data to a trace buffer (not shown), which may be on or off chip.

In the embodiment of FIG. 1, the processing state information output by the first and second processors 112, 122 that is used as a basis for determining which of the two processors should be traced by the on-chip trace module at any one time is context identifier (CID) information. Context identifiers provide an indication of which particular processing task is currently running on the corresponding processor. The first and second processors 112, 122 are capable of concurrently performing respective processing tasks and accordingly each processor will typically have a respective different context identifier at a given time when data processing is being performed.

A first processor 112 comprises a first context identifier register 114 whilst a second processor 122 comprises a second context identifier register 124. These context identifier registers will be described in more detail below with regard to FIG. 2.

Trace data generated by the trace generating circuitry 134 and supplied to the trace buffer (not shown) will typically be analysed by a general purpose computer (not shown) operating as a trace analysing tool under the control of trace analysing software. The output of the trace generating circuitry 134 comprises trace elements which can be used by the trace analysing tool to reconstruct the architectural state of the symmetric multi-processor system. Reconstruction of the architectural state enables step-by-step activity of the multi-processor system to be determined.

The programming interface 170 receives via a path 171, information from debug tools with regard to which processing tasks are to be debugged using information output by the on-chip trace module 130. The programming interface 170 supplies information about a given processing task to be debugged to each of the comparators 142, 152 via a signal path 173. A register 144 of the first comparator and a corresponding register 154 of the second comparator 152 are used to store identification information with regard to the processing task of interest to the debug tools. The first comparator module 142 receives via a signal path 115 from the first processor 112 diagnostic information including the contents of the context identifier register 114. The first comparator module 142 compares the received context identifier from the first processor with the information in the register 144 identifying the processing task of interest to the debug tools. The output of the first comparator module 142 is supplied to the arbitration circuitry 160 via a path 141 and provides and indication as to whether or not the processing task of interest stored in register 144 matches the current context identifier output by the first processor 112.

Similarly the second comparator module 152 receives, via a signal path 125 from the second processor 122, diagnostic information including the current context identifier stored in the second context identifier register 124 of the second processor 122. The second comparator module performs a comparison between information stored in the register 154 representing the processing task of interest to the debug tools with the context identifier supplied by the second processor 122 and outputs the result of the comparison via signal path 153 to the arbiter 160.

The arbiter 160 collates the results of the respective comparisons from the first comparator module 142 and the second comparator module 152, and on the basis of this information, determines whether the first multiplexer 132a should currently be controlled to output diagnostic information from the first processor 112 or from the second processor 122. Since, in the symmetric multi-processor system of FIG. 1, a given processing task can switch between the two processors 112, 122, the arbiter 160 is likely to have to change the output of the first multiplexer 132a at some point during execution of the processing task of interest. The second multiplexer 132b outputs to the comparators 136 via path 135 output from either the first comparator module 142 or the second comparator module 152.

Note that, in addition to supplying diagnostic information to the respective comparators 142, 152, the first processor 112 also outputs the diagnostic information via a signal path 117 as input to the first multiplexer 132a and the second processor 122 also supplies its diagnostic data via a signal path 127 to the first multiplexer 132a. The arbiter 160 controls which of the two streams of diagnostic data is actually output to the on-chip trace module is controlled. Data from the two comparator modules 142, 152 may also be supplied to the comparator circuitry 136 of the on-chip trace module via a signal path 135. The context identifiers stored in the context identifier registers 114, 124 of the two processors 112, 122 are used in this embodiment to enable the operating system of the respective processor to communicate its context to the debug tools. The first and second comparator modules 142, 152 and the comparator circuitry 136 of the on-chip trace module 130 are capable of performing a plurality of different comparisons. The comparator circuitry 136 of the on-chip trace module 130 may calculate advanced conditions used for controlling trace output, but which are not necessary to control the multiplexer 132. This comparator circuitry 136 is shared between the two processors to reduce the size of the circuit design. In particular, in addition to comparisons based on context identifiers already discussed above, further comparisons can be performed based on the current instruction execution address and the current data transfer address.

Figure 2:
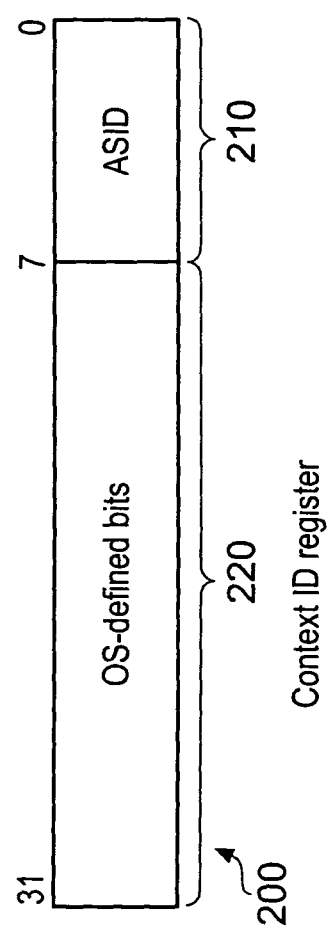
FIG. 2 schematically illustrates the configuration of the context identify registers 114, 124 of the processors of FIG. 1 in more detail.

FIG. 2 schematically illustrates the configuration of the context identifier registers 114, 124 of the processors 112, 122 of FIG. 1 in more detail. Register 200 of FIG. 2 is a thirty-two bit register in which bits 7:0 are allocated to an application space identifier (ASID), whilst bits 31:8 are operating-systems defined bits, which allow the operating system to communicate its context to the debugging tools.

In the embodiment of FIG. 1, the memory system 102 comprises a main memory (not shown) that may not have sufficient capacity to store all of the instructions and data required for a given processing application. Accordingly, a "virtual memory" is used to enable more efficient use of the real physical memory (i.e. main memory). In addition, to enable program code associated with a program application to be stored (at least in part) on external storage such as hard disk storage, the virtual memory is used to give an application program the impression that it has contiguous working physical memory, but it is in fact physically fragmented. The main memory of the memory system 102 has a plurality of associated memory maps each of which provides a mapping from virtual to physical memory addresses. The mappings will change depending upon the state of operation of the processors 112, 122.

The first processor 112 of FIG. 1 will typically be operating according to a first memory map whilst the second processor 122 of FIG. 1 will typically be operating according to a second, different, memory map at a given time when each of the two different processors is currently executing a different respective process. The ASID bits 210 of FIG. 2 select a currently-active memory map for the corresponding processor. The ASID 210 is used in conjunction with the OS-designed bits 220 in the case that more than 256 memory maps are in use. In this particular embodiment, the memory map changes with the processing task but does not change for different threads associated with the same processing task. The comparators 142, 152 of FIG. 1 perform a masked comparison of the context identifier register 200 to extract the memory map information contained therein. Thus the context identifiers effectively identify the mapping currently being used by the main memory for a given processing task.

Figure 3:
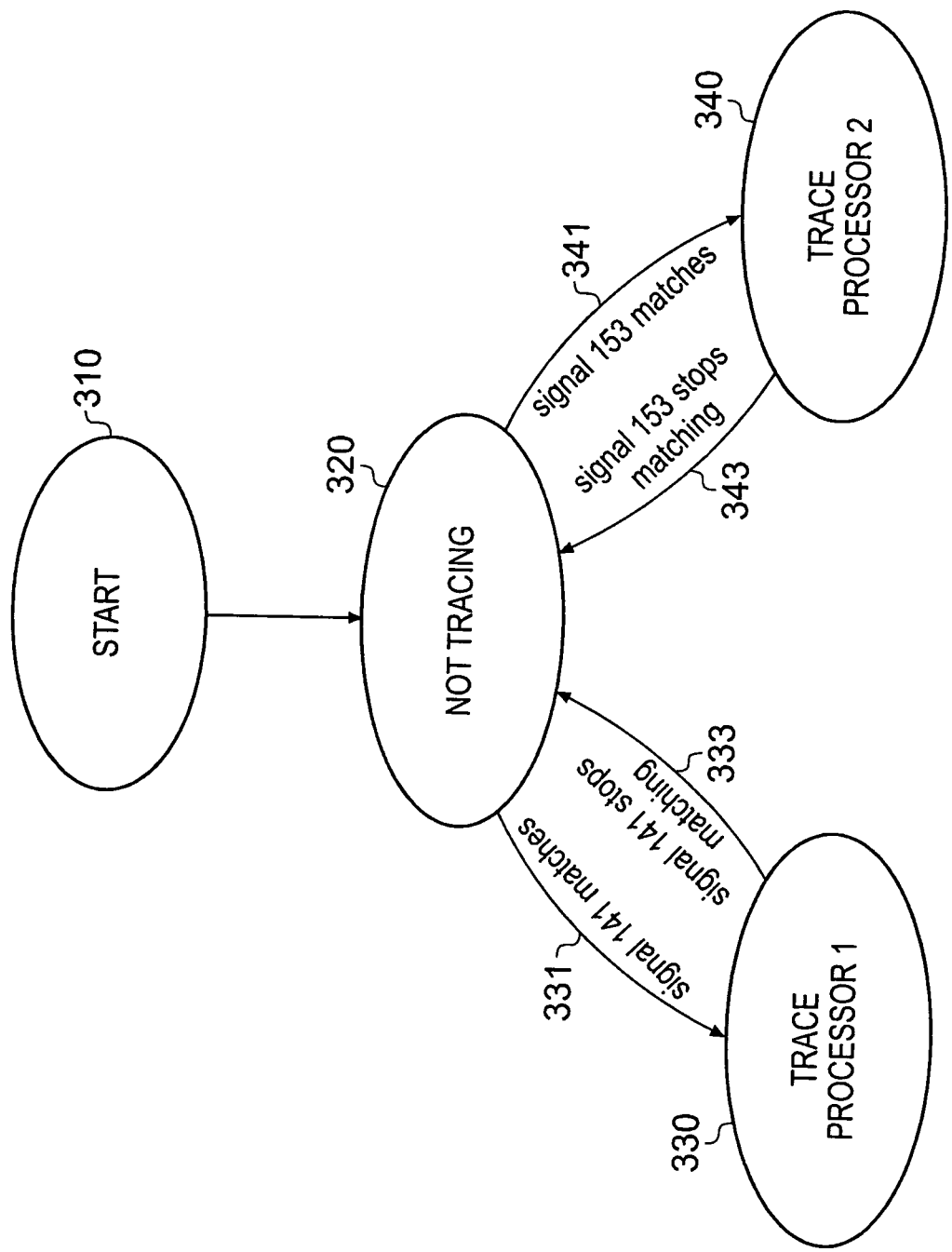
FIG. 3 is a state diagram that schematically illustrates the state of the on-chip trace module 130 of FIG. 1 in dependence upon the results of the context identifier comparisons performed by the comparator modules 142, 152.

FIG. 3 is a state diagram that schematically illustrates the state of the on-chip trace module 130 of FIG. 1 and how the state changes in dependence upon the results of the context identifier comparisons performed by the comparator modules 142, 152.

When the system of FIG. 1 has started executed processing tasks, there are essentially three different states of operation: a first state 320 in which the on-chip trace module 130 is not tracing; a second state 330 in which the on-chip trace module 130 is tracing the first processor 112 and; a third state 340 in which the on-chip trace module 130 is tracing the second processor 122.

When data processing first starts, at state 310, the system initially enters the not tracing state 320 until a trigger condition is detected by the on-chip trace module 130. Consider, for example, the situation where given process to be debugged starts execution on the first processor 112 but subsequently switches to execution by processor 122. The first comparator module 142 and the second comparator module 152 continuously monitor the context identifiers output by the first processor 112 and the second processor 122 respectively. Since the process of interest begins execution on the first processor 112, the first comparator module 142 is first to detect a context identifier match with the process of interest. The fact that a match has occurred is signalled from the first comparator module 142 to the arbitration circuitry 160, which controls the multiplexer 132 to output diagnostic data (from the first processor 112) along path 133 to the trace generation circuitry. In this event, the multi-processor system makes a transition from the not tracing state 320 to the state 330 of tracing the first processor. The system remains in state 330 for as long as the first comparator module 142 indicates that there is a match between the context identifier in register 114 and the process of interest.

However, at some point during execution of the given process, a switch is made between execution of the process on the first processor 112 and execution of the process on second processor 122. Whilst the switch is being performed, the first comparator module 142 stops having a match condition and thus path 333 of the state diagram of FIG. 3 is followed and the system returns to the not tracing state 320. Once the switch of processing to the second processor 122 has been established, the context identifier stored in register 124 of the second processor 122 will provide a match. Thus the second comparator module 152 outputs a match condition via signal path 153 to the arbitration circuitry 160. This results in the multiplexer 132 being controlled to output diagnostic data originating from the second processor 122.

The path 341 on FIG. 3 from the "not tracing" state 320 to the third state 340 is followed when the second comparator module 152 of FIG. 1 indicates a match to the process of interest This transition from the not tracing state 320 to the state 340 of tracing the second processor involves the switching of the multiplexer 132 and re-enabling tracing along the path 341.

The system remains in the state 340 of tracing the second processor for as long as the second comparator module 152 indicates a match to the process of interest. However, at some point, the second comparator module 152 indicates that there is no longer a match with the process of interest so the system moves along the path 343 from the state 340 of tracing the second processor back to the not tracing state 320. It may well be that the process has finished executing in which case the system will remain in the not tracing state until the debug tools signal via the program interface that a different process of interest should be monitored. Alternatively, execution of the initial process of interest may switch several times between the first processor 112 and the second processor 122 and in this case the tracing will switch between states 330 and 340 in dependence upon which of the first and second comparator modules 142, 152 indicates a match condition at the relevant time.

Figure 4:
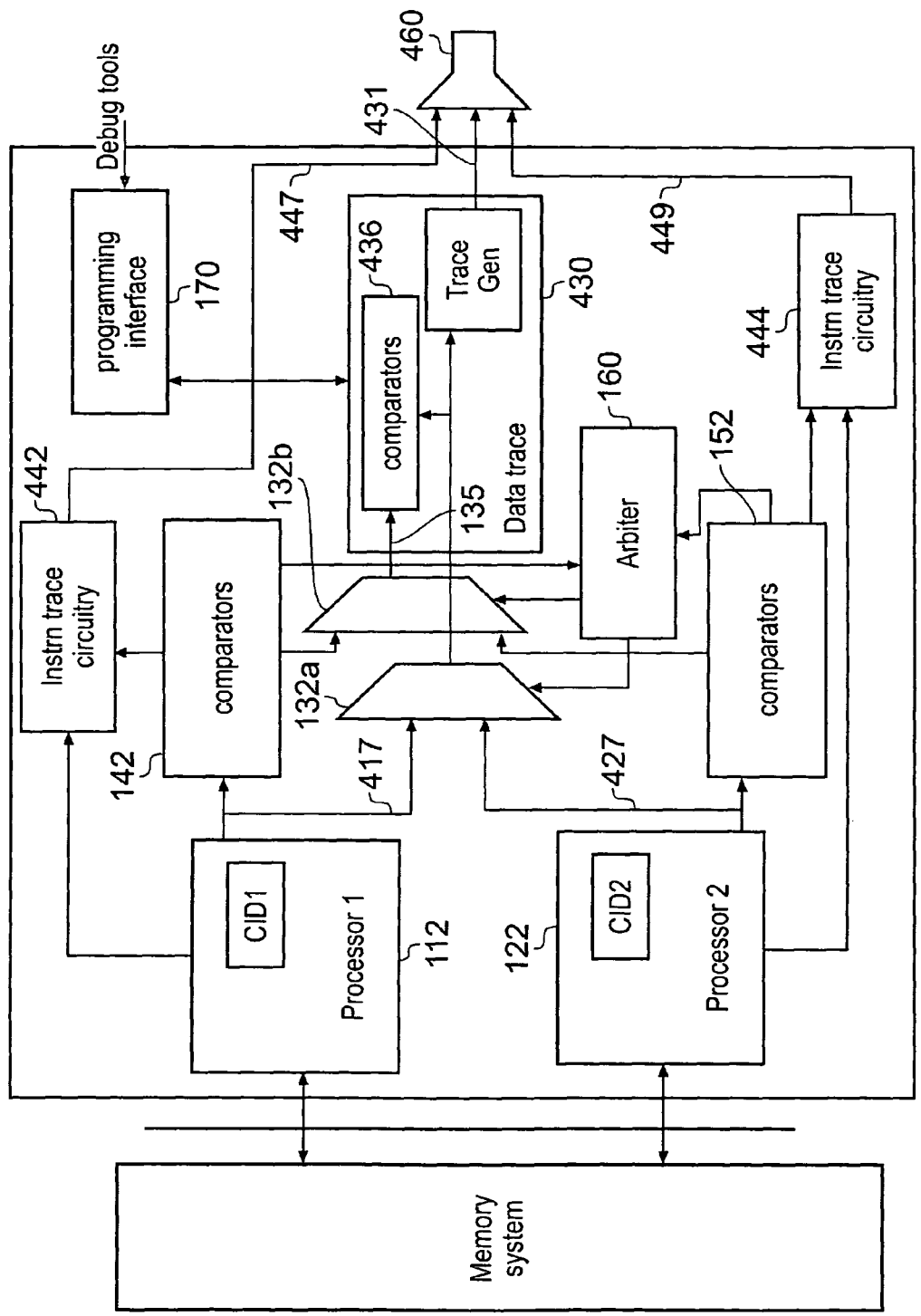
FIG. 4 schematically illustrates a second embodiment of a multi-processor system.

FIG. 4 schematically illustrates a second embodiment of a symmetric multi-processor system. In this arrangement, instead of providing a single common on-chip trace module shared between the first and second processors for tracing of both data and instructions, a single common on-chip trace module is provided to perform data trace, whereas separate instruction tracing circuitry is provided for each of the two processors 112, 122. The memory system 102, first and second processors 112, 122 and their respective comparator modules 142, 152 perform the same functions as the correspondingly numbered elements of FIG. 1. Also, similarly to FIG. 1, the multiplexer 132 is controlled by the arbitration circuitry 160 to output to diagnostic data either from the first processor 112 or the second processor 122 in dependence upon whether or not there is a match between the context ID for the respective processor and the process of interest to the debug tools.

However, the arrangement of FIG. 4 has an on-chip data trace module 430 configured only to perform data trace but not to perform instruction trace. This means that the diagnostic data routed from the first processor 112 via a path 417 to the first multiplexer 132a and the diagnostic data routed from the second processor 142 to the first multiplexer 132a via a signal path 427 comprises only data trace but not instruction trace unless needed by the comparators 436. The data trace diagnostic information will typically be derived from one or more buses in the corresponding processor.

The first processor 112 has dedicated instruction trace circuitry 442 to trace instructions being executed on that processor. Similarly the second processor 122 has respective instruction trace circuitry 444 to trace instructions being executed by the second processor. Instruction trace information is likely to be derived from, for example, the pipeline rather than from the bus. Since execution of instructions tends to be sequential, instruction trace is typically more deterministic than data trace because data access operations will not necessarily be sequentially performed. The instruction trace circuitry 442 and 444 keep track of whether or not certain conditional branches have been taken by the respective processor and also keep track of which instructions have been executed. In the FIG. 4 arrangement there is a path from the first comparator module 142 to the instruction trace circuitry 442 and a path from the second comparator module 152 to the instruction trace circuitry 444. The programming interface 170 of FIG. 4 is used to program the two comparator modules 142, 152 and also each of the two sets of instruction trace circuitry 442, 444. The instruction trace is likely to be more compact than the data trace, so replication of the instruction trace circuitry for each processor but providing a common on-chip trace module 430 for data trace is still more efficient than providing separate combined instruction and data trace modules for each processor.

The first processor 112 has a corresponding first instruction trace data stream 447 output by the first instruction trace circuitry 442 whilst the second processor 122 has a second instruction trace data stream 449 output by the second instruction trace circuitry 444. The trace data stream is output via signal path 431 from the on-chip data trace module 430 and the data trace output signal switches between trace data corresponding to the first processor 112 and data trace corresponding to the second processor 122 in dependence upon the current control configuration of the multiplexer 132. The trace data stream 431 and the two instruction trace streams 447, 449 are combined by a trace combiner 460 for output to debug software.

Figure 5:
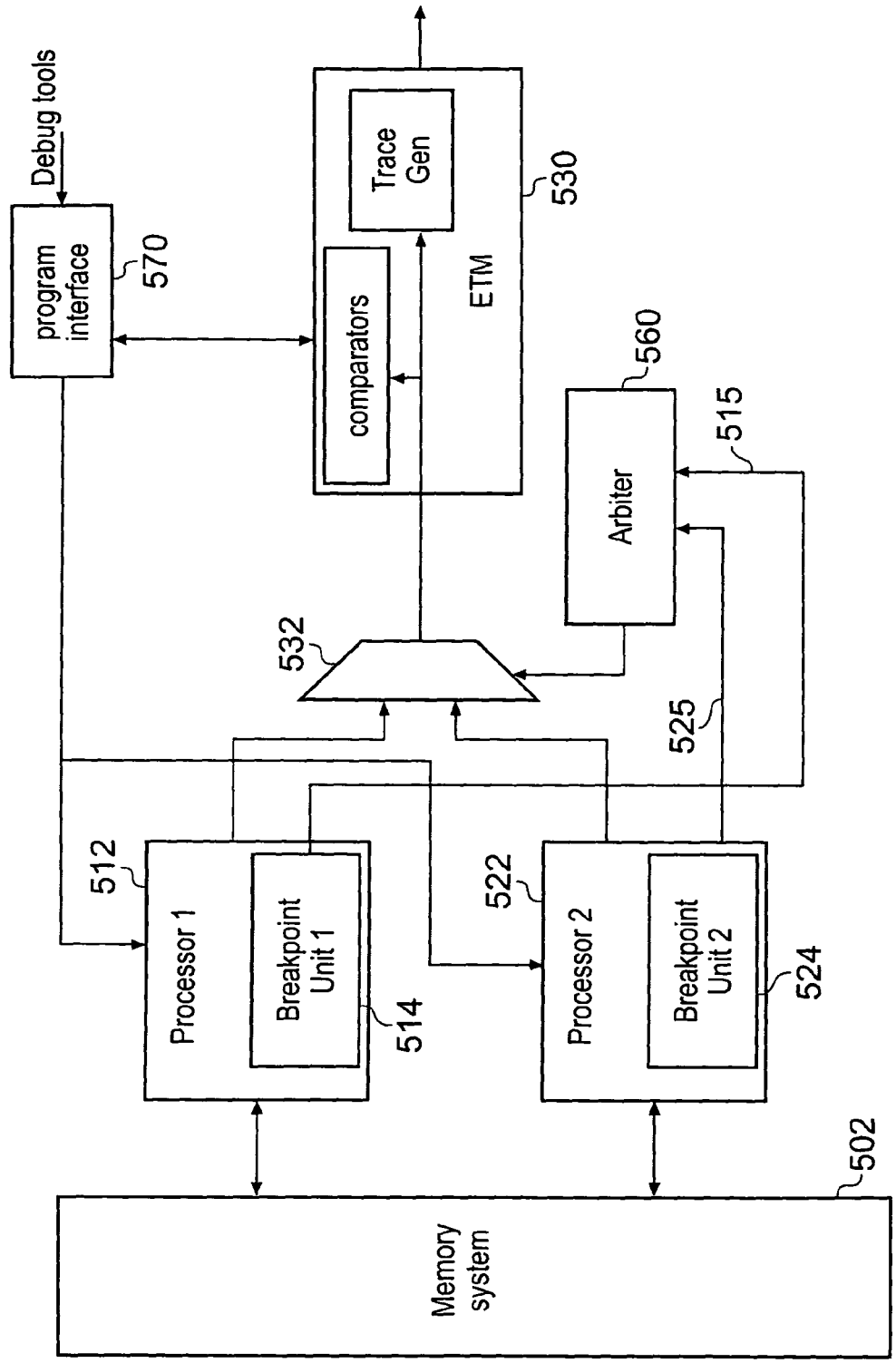
FIG. 5 schematically illustrates a third embodiment of a multi-processor system which uses comparison resources integral to the individual processors to provide processing state information to the tracing circuitry.

FIG. 5 schematically illustrates a third embodiment of a multi-processor system which uses comparison resources integral to the individual processors to provide processing state information to the tracing circuitry. The arrangement of FIG. 5 comprises: a memory system 502; a first processor 512; a second processor 522; arbitration circuitry 560; a multiplexer 532; an on-chip trace module 530 and a program interface 570. The first processor 512 has a first breakpoint unit 514 whilst the second processor 522 has a second breakpoint unit 524. The on-chip trace module 530 of the embodiment of FIG. 5 is similar in structure and function to the on-chip trace module 130 of FIG. 1 and it traces both data and instructions. However, in the embodiment of FIG. 5, the multiplexer 532 switches between output diagnostic data from the first processor 512 to output data corresponding to the second processor 524 in dependence upon a control signal issued by the arbitration circuitry 560.

The arbitration circuitry 560 determines which of the two processors 512, 524 should be traced in dependence upon processing state information output by each of the two breakpoint units 514, 524 with regard to a process currently being executed on the respective processor. By way of contrast, in FIG. 1 the arbitration circuitry 160 controls the multiplexer in dependence upon a comparison of context identifiers performed by the dedicated comparator modules 142, 152 associated with each processor. The comparison circuitry that provides the processor state information in the embodiment of FIG. 5 is a resource residing within the respective processor 512, 522 rather than being circuitry external to the processor as in FIG. 1.

A breakpoint is a location in a program at which the execution of the program is stopped and the control of the executing processor is switched to a debugger. Typically the debugger will stop execution of the program in dependence upon the type of breakpoint. Accordingly, for example, the execution can be stopped: if a specific line has been reached; if a specific memory location is written to or read from; or if some other specific condition has been met. The breakpoint units 514, 524 are capable of setting breakpoints for data as well as for instructions. The breakpoint units comprise breakpoint comparators and breakpoint registers that can be programmed with the necessary data, address or instruction to set an appropriate breakpoint.

If a given application program is started and executed, debugging software will control the processors 512, 524 via the program interface 570 to generate a trap when the system execution encounters the predetermined breakpoint. Thereafter, the state of the processor resource will be released in order to track the processor state. In the embodiment of FIG. 5, the breakpoint units 514, 524 are arranged such that, instead of implementing a break in execution when a breakpoint is encountered, the breakpoint units indicate to the arbitration circuitry 560 that a given breakpoint condition has been reached. The arbitration circuitry 560 then controls the multiplexer 532 to output trace data corresponding to the processor of the breakpoint unit that encountered the breakpoint.

The first breakpoint unit 514 signals a breakpoint encounter to the arbitration circuitry 560 via a signal path 515 whereas the second breakpoint unit 524 signals encountering of a breakpoint to the arbitration circuitry 560 via a signal path 525. Thus in the embodiment of FIG. 5 breakpoint circuitry that is already likely to be present in the respective processors is redeployed for the purpose of providing processing state information to the arbitration circuitry 560 to control select switching of the on-chip tracing module trace operation between the first processor 512 and the second processor 522.

Figure 6:
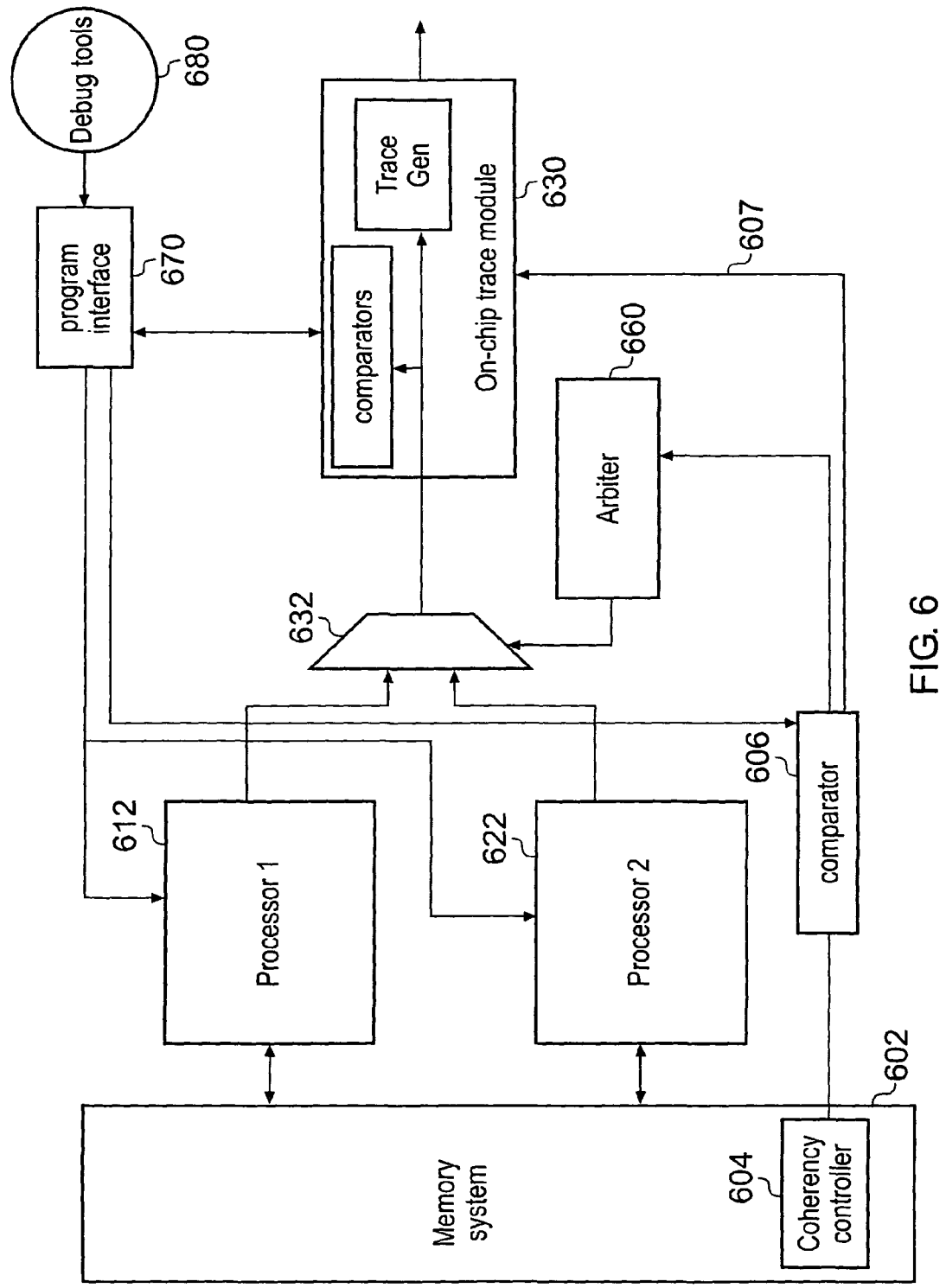
FIG. 6 schematically illustrates the fourth embodiment of the symmetric multi-processor system.

FIG. 6 schematically illustrates the fourth embodiment of a symmetric multi-processor system. In this embodiment the processing state information used to guide selective switching between outputting diagnostic information from a first processor to a second processor is state information derived from the memory system rather than directly from the processors.

The arrangement of FIG. 6 comprises: a memory system 602 having a coherency controller 604; a first processor 612: a second processor 622; a multiplexer 632; an on-chip trace module 630; a comparator 606; arbitration circuitry 660; and a program interface 670. In this embodiment, the arbitration circuitry 660 controls the multiplexer 632 to switch between outputting diagnostic data of the first processor 612 and the second processor 622 in dependence upon processing state information derived from the coherency controller 604 of the memory system 602. Thus, in the FIG. 6 embodiment, information from the memory system 602 rather than from the processors 612, 602 themselves are used to control selective switching of the tracing.

In the symmetrical multi-processor system of FIG. 6, the memory system 602 comprises a plurality of layers of memory (not shown) such as L1 memory, L2 memory and external storage. The coherency controller 604 serves to control access by the two processors 612, 622 to a cache memory within the memory system. A protocol known as a Modified, Exclusive, Shared, Invalid (MESI) protocol is used to specify how a cache within the memory system 602 communicates with the two processors 612, 622 and how a plurality of different caches communicate with each other so that the processors 612, 622 have a predictable view of memory. A cache that provides such a predictable view of memory is said to be a coherent cache. According to the MESI cache coherence protocol each block in a cache line is marked with one of the four states i.e. Modified, Exclusive, Shared or Invalid. Cache line accesses are only allowed if the cache state is correct with respect to the coherence protocol. For example, a cache line that is marked invalid is not allowed to be provide data to a processor and cache line data is not allowed to be updated unless the line is in either the exclusive or modified state. Details of properties associated with each of the four states MESI are provided in the table below.

TABLE 1

|  | Can Read | Can Write | Must Clean | Others can share |
|---|---|---|---|---|
| Modified | yes | yes | yes | No |
| Exclusive | yes | yes | no | No |
| Shared | yes | no | no | Yes |
| Invalid | no | no | no | N/A |

According to the states defined in table 1 above, writes to a cache line can be performed only if the cache line is either in the Modified state of in the Exclusive state. The coherency controller 604 keeps track of which of the two processors 612, 622 has write control to a given cache line at a given point in time. Recall that in any symmetric multi-processor system, both of the processors 612, 622 have equal access to the memory system 602.

A comparator 606 is provided along a signal path between the coherency controller 604 and the arbitration circuitry 660. This comparator 606 is programmed by the debug tools 680 via the program interface 670 to compare output of the coherency controller 604 in order to determine writes control attributes held by each of the two processors. The comparator 606 is programmed to monitor writes to a given memory in particular which processor has write access control to the given memory location by identifying cache lines containing the watched location. This can be done in systems implementing the MESI protocol by identifying cache lines in the Modified state or in the Modified or Exclusive states. The output of the comparison is provided to the arbiter 660, which determines whether or not tracing should be triggered according to which of the two processors currently has write control to a given cache memory location A write to a given cache memory location is useful as a trigger for tracing because bugs can frequently be diagnosed by their effect on data structures. By tracing the processor that has access to a given data structure it is possible to trace the code that modifies the data structure and thus trace the code that corrupts it. A path 607 is provided to supply output of the comparator 606 to the on-chip trace module so that the comparator 606 outputs can be used for further trace filtering.

Figure 7:
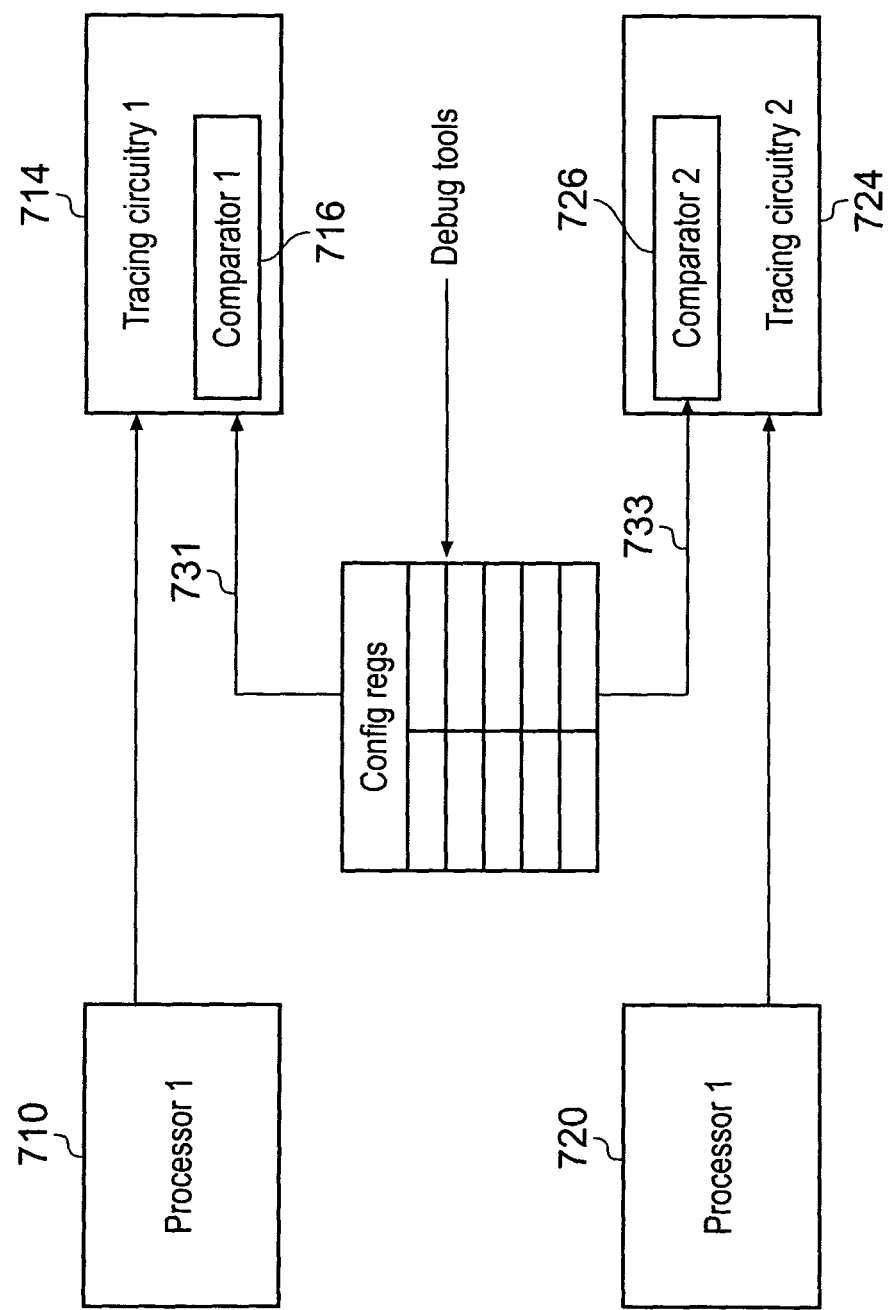
FIG. 7 schematically illustrates a fifth embodiment of the present invention, in which separate tracing circuitry is provided for each individual processor but a common configuration register is used.

FIG. 7 schematically illustrates a fifth embodiment of the present invention, this embodiment differs from the embodiments of FIGS. 1, 4, 5 and 6 because separate tracing circuitry is provided for each individual processor. Accordingly there is no switching of tracing circuitry from generating trace streams corresponding to the first processor and to the second processor. Instead, in the arrangement of FIG. 7, one or more common configuration registers is provided which is shared between two sets of tracing circuitry. The arrangement of FIG. 7 comprises a first processor 710 having a corresponding set of tracing circuitry 714 having a first comparator 716. The arrangement further comprises a second processor 720 having an associated second set of tracing circuitry 724, the second set of tracing circuitry having a second comparator 726. A set of configuration registers 730 is provided and is shared between the first set of tracing circuitry 714 and the second set of tracing circuitry 724. The first comparator 716 and the second comparator 726 of the two sets of tracing circuitry 714, 724 perform comparisons on processing state information to determine whether their tracing should be switched on or off for the respective processor. The common set of configuration registers 730 is used to supply comparison conditions to both of the two comparators 716, 726 corresponding to a given tracing trigger condition such as information identifying a process that it is desired to be traced. Since a given process can switch between executing the first processor 710 and the second processor 720 prior to completion of the processor task it is likely to be the case that both of the individual sets of tracing circuitry 714, 724 should be configured to perform a comparison based upon the same condition. Sharing the single set of configuration registers 730 between the two sets of tracing circuitry 714, 724 avoids duplication of circuitry and makes the implementation of tracing more efficient.

It can be seen that a first signal path 731 is provided between the configuration registers and the first set of tracing circuitry 714 and a second signal path 733 is provided between the configuration registers 730 and the second set of tracing circuitry 724. The configuration of each of the sets of tracing circuitry 714, 724 in this embodiment is identical and the use of the common set of configuration registers 730 together with the two sets of tracing circuitry 714, 724 allows the two processors 710, 720 to be traced substantially simultaneously.

Figure 8:
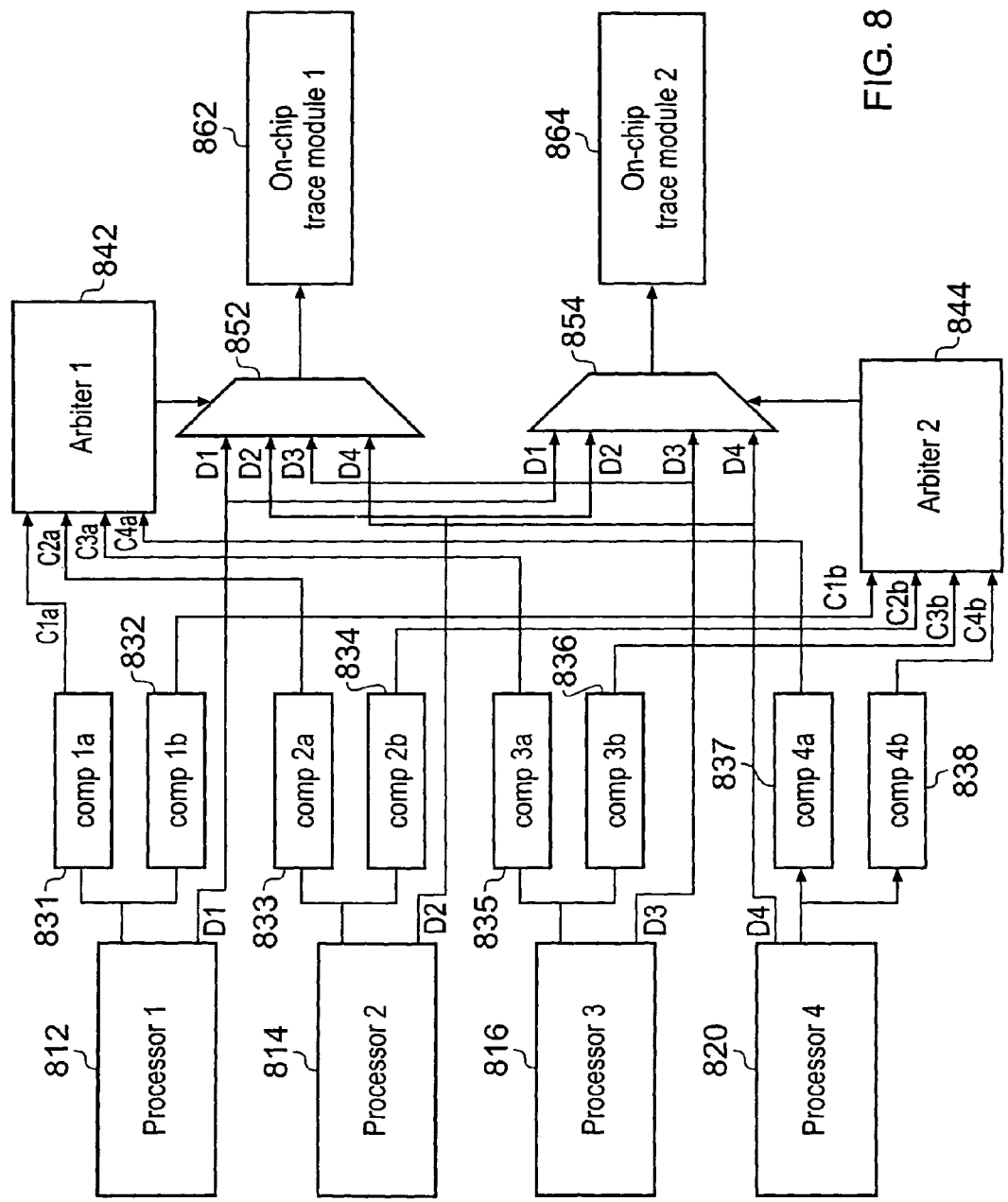
FIG. 8 schematically illustrates a sixth embodiment of the present invention comprising a symmetric multi-processor system having both a plurality of processors and a plurality of on-chip trace module where the number of on-chip trace modules is less than the number of processors.

FIG. 8 schematically illustrates a sixth embodiment of the present invention comprising a symmetric multi-processor system having a plurality of processors and a plurality of on-chip trace modules, but where the number of on-chip trace modules is less than the number of processors. In the particular embodiment of FIG. 8, there are four processors 812, 814, 816, 820 and two on-chip trace modules 862, 864. Each of the four processors comprises two independent comparator modules for performing a comparison in dependence upon the state information for outputting to respective arbiters.

For example, the first processor 812 comprises a first comparator module 831 which performs a comparison relevant to the tracing of the first on-chip trace module 862 and further comprises a second comparator 832 for performing a different comparison, which is relevant for tracing of the second on-chip trace module 864.

A first arbiter 842 controls a multiplexer 852 corresponding to the first on-chip trace module 862 whilst a second arbiter 844 controls a multiplexer 854 corresponding to the second on-chip trace module 864. Four comparators (one associated with each of the four processors) i.e. comparators 831, 833, 835 and 837 perform comparisons based upon a given first condition and supply the output of that comparison to the first arbiter 842. Each of the four processors 812, 814, 816, 820 also comprises a respective second different comparator 832, 834, 836, 838 and each of these four second comparators performs a comparison based upon a given second condition and supplies the result of the comparison to the second arbiter 844. Similarly to the embodiment of FIG. 1, the comparison is based upon context identifier information. In alternative embodiments the processing state information upon which the comparison is based is some other kind of processing state information such as cache coherency information.

The first processor 812 outputs a diagnostic data signal D1 to both the first multiplexer 852 and the second multiplexer 854. Similarly the second processor outputs a diagnostic signal D2; the third processor 816 outputs a diagnostic signal D3; and the fourth processor 820 outputs a diagnostic signal D4. All four of these diagnostic signals D1, D2, D3 and D4 are supplied to both the first multiplexer 852 and the second multiplexer 854. Thus, the first multiplexer 852 and the second multiplexer 854 are each capable of outputting to the respective on-chip trace module 862, 864 diagnostic data corresponding to any one of the four different processors 812, 814, 816, 820 in dependence upon the control signal supplied to that multiplexer by its corresponding arbiter 842 or 844.

The two different on-chip trace modules 862, 864 are capable of performing different tracing operations on any one of the four processors at any given time. The first set of four comparators 831, 833, 835, 837 together with the first arbiter 842 and the first multiplexer 852 represent selection circuitry enabling the first on-chip trace module 862 to be selectively switched from tracing one of the four processors to tracing any other of the four processors in dependence upon the processing state information output by the processors to the comparators. Similarly the second set of four comparators 832, 834, 836, 838 together with the second arbiter 844 and the second multiplexer 854 serve as selection circuitry configurable to selectively switch between tracing of one of the four processors 812, 814, 816, 820 to tracing of any other one of the four processors during execution of processing instructions in dependence upon processing state information. The selective switching of each of the two trace modules 862, 864 in this way avoids the requirement to have a separate on-chip trace module for each of the four processors 812, 814, 816, 820 and hence is more efficient to implement.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. Apparatus for processing data for performing one or more processing tasks by executing sequences of program instructions, said apparatus comprising:
   a plurality of processing circuits each having access to a memory;
   tracing circuitry configured to generate a stream of trace data indicative of processing operations being performed by at least one of said plurality of processing circuits, said tracing circuitry is separate from and shared between said plurality of processing circuits;
   selection circuitry configured to selectively switch, during execution of said program instructions, said tracing circuitry from generating a first stream of trace data corresponding to one of said plurality of processing circuits to generating a second different stream of trace data corresponding to a different one of said plurality of processing circuits in dependence upon processing state information provided by at least one of said plurality of processing circuits.

2. Apparatus as claimed in claim 1, wherein said plurality of processors comprises a symmetric multi-processor system in which execution of a given one of said one or more processing tasks may switch from one of said plurality of processing circuits to another different one of said plurality of processing circuits during said execution.

3. Apparatus as claimed in claim 1, wherein said processing state information comprises an indication of whether a configurable condition within a corresponding one of said plurality of processing circuits has been satisfied.

4. Apparatus as claimed in claim 1, wherein said processing state information comprises information identifying which of said plurality of processing circuits is currently executing a given processing task.

5. Apparatus as claimed in claim 1, wherein said processing state information comprises information identifying a given thread corresponding to said given processing task.

6. Apparatus as claimed in claim 1, wherein said processing state information comprises information identifying a given instruction execution address.

7. Apparatus as claimed in claim 1, wherein said processing state information comprises information identifying which of said plurality of processing circuits currently has write access to a given location in said memory.

8. Apparatus according to claim 7, comprising comparator circuitry configurable to perform a comparison of said processing state information from at least one of said plurality of processing circuits with a configurable condition.

9. Apparatus as claimed in claim 8, wherein said comparator circuitry is arranged to perform a comparison of said processing state information from each of said plurality of processing circuits using a given configurable condition.

10. Apparatus as claimed in claim 8, wherein said comparator circuitry is arranged to perform said comparison based on context identifier information from a corresponding one of said plurality of processing circuits.

11. Apparatus as claimed in claim 10, wherein said context identifier information comprises information identifying a memory map currently being used by the corresponding one of said plurality of processing circuits.

12. Apparatus as claimed in claim 1, wherein at least one of said plurality of processing circuits comprises breakpoint circuitry and wherein said breakpoint circuitry is configured to perform a comparison of said processing state information from the corresponding one of said plurality of processing circuits with a configurable condition and configured to supply a result of said comparison to said selection circuitry.

13. Apparatus as claimed in claim 8, wherein at least two of said plurality of processing circuits have respective comparator circuits performing said comparison based on said configurable condition.

14. Apparatus as claimed in claim 13, comprising arbitration circuitry responsive to comparison results from said respective comparator circuits to determine whether any of said at least two processing circuits has satisfied said configurable condition.

15. Apparatus as claimed in claim 1, comprising a plurality N of processing circuits and a plurality M of modules of said tracing circuitry, where M and N are non-zero integers and wherein M is less than N.

16. Apparatus as claimed in claim 1, wherein said tracing circuitry is configured to generate both data trace and instruction trace.

17. Apparatus as claimed in claim 1, wherein said selectively switchable tracing circuitry is configured to generate data trace but not instruction trace.

18. Apparatus as claimed in claim 15, comprising for each of said plurality of processing circuits, a respective module of instruction tracing circuitry.

19. Apparatus as claimed in claim 3, wherein said apparatus comprises a programming interface and said configurable condition is configurable by debugging software via said programming interface.

20. Apparatus as claimed in claim 2, wherein said memory comprises a coherency controller and wherein said processing state information is output by said coherency controller.

21. Apparatus according to claim 20, wherein said processing state information comprises an indication of which of said plurality of processors currently has write access to a given location in said memory.

22. Apparatus as claimed in claim 1, wherein said selection circuitry is configurable to suppress said selective switching of said tracing activity such that whilst said suppression is performed, said tracing activity generates a trace data stream corresponding to a given one of said plurality of processing circuits regardless of said processing state information.

23. A method of generating trace information in a data processing apparatus having a plurality of processing circuits each having access to a memory and capable of performing one or more processing tasks by executing sequences of program instructions, said method comprising:

generating with tracing circuitry a stream of trace data indicative of processing operations being performed by at least one of said plurality of processing circuits, said tracing circuitry is separate from and shared between said plurality of processing circuits; and selectively switching, during execution of said program instructions, said tracing circuitry from generating a first stream of trace data corresponding to one of said plurality of processing circuits to generating a second different stream of trace data corresponding to a different one of said plurality of processing circuits in dependence upon processing state information provided by at least one of said plurality of processing circuits.

24. A computer program product comprising a non-transitory computer readable storage medium carrying a computer program for controlling a data processing apparatus having a plurality of processing circuits each having access to a memory and capable of performing one or more processing tasks by executing sequences of program instructions, said computer program controlling said data processing apparatus to perform the steps of:

generating with tracing circuitry a stream of trace data indicative of processing operations being performed by at least one of said plurality of processing circuits, said tracing circuitry is separate from and shared between said plurality of processing circuits; and selectively switching, during execution of said program instructions, said tracing circuitry from generating a first stream of trace data corresponding to one of said plurality of processing circuits to generating a second different stream of trace data corresponding to a different one of said plurality of processing circuits in dependence upon processing state information provided by at least one of said plurality of processing circuits.

25. Apparatus for processing data for performing one or more processing tasks by executing sequences of program instructions, said apparatus comprising:

a plurality of modules of tracing circuitry for generating a stream of trace data indicative of processing operations being performed by a respective one of a plurality of processing circuits of a multi-processor device, each of said plurality of modules of tracing circuitry is separate from said plurality of processing circuits and comprises a respective comparison circuit for controlling the activities of the corresponding module of tracing circuitry dependent upon processing operations performed by the corresponding processing circuit; and at least one common configuration register configurable to store configuration data for commonly controlling a plurality of said comparison circuits.

26. A method of generating trace information in a data processing apparatus having a plurality of modules of tracing circuitry corresponding to a respective plurality of processing circuits of a multi-processor device, each of said plurality of modules of tracing circuitry is separate from said plurality of processing circuits and comprises a respective comparison circuit for controlling the activities of the corresponding module of tracing circuitry dependent upon processing operations performed by the corresponding processing circuit, said method comprising the steps of:

storing in at least one common configuration register configuration data for commonly controlling a plurality of said comparison circuits;

generating in dependence upon said configuration data stored in said common configuration register and using one of said plurality of modules of tracing circuitry, a stream of trace data indicative of processing operations being performed by a respective one of a plurality of processing circuits of a multi-processor device.

27. Apparatus for processing data for performing one or more processing tasks by executing sequences of program instructions, said apparatus comprising:

a plurality of means for processing each having access to a memory;

means for tracing for generating a stream of trace data indicative of processing operations being performed by at least one of said plurality of means for processing, said means for tracing is separate from and shared between said plurality of means for processing;

means for selectively switching, during execution of said program instructions, said means for tracing from generating a first stream of trace data corresponding to one of said plurality of means for processing to generating a second different stream of trace data corresponding to a different one of said plurality of means for processing in dependence upon processing state information provided by at least one of said plurality of means for processing.

28. Apparatus for processing data for performing one or more processing tasks by executing sequences of program instructions, said apparatus comprising:

a plurality of means for tracing for generating a stream of trace data indicative of processing operations being performed by a respective one of a plurality of means for processing of a multi-processor device, each of said plurality of means for tracing is separate from said plurality of processing circuits and comprises a respective means for comparison for controlling the activities of the corresponding means for tracing dependent upon processing operations performed by the corresponding means for processing; and at least one common means for storing for storing configuration data for commonly controlling a plurality of said means for comparison.

* * * * *